US 8,698,066 B2

(12) United States Patent
Sugita

(10) Patent No.: US 8,698,066 B2
(45) Date of Patent: Apr. 15, 2014

(54) PHOTODETECTING DEVICE AND DISPLAY APPARATUS

(75) Inventor: Yasuhiro Sugita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 203 days.

(21) Appl. No.: 13/321,132

(22) PCT Filed: May 17, 2010

(86) PCT No.: PCT/JP2010/058303
§ 371 (c)(1),
(2), (4) Date: Nov. 7, 2001

(87) PCT Pub. No.: WO2010/140466
PCT Pub. Date: Dec. 9, 2010

(65) Prior Publication Data
US 2012/0068054 A1 Mar. 22, 2012

(30) Foreign Application Priority Data
Jun. 4, 2009 (JP) ................................. 2009-135308

(51) Int. Cl.
H01J 40/14 (2006.01)
H01L 31/00 (2006.01)
H04N 3/14 (2006.01)

(52) U.S. Cl.
USPC ..................... 250/214 R; 250/214.1; 348/308

(58) Field of Classification Search
USPC ......... 250/214.1, 216; 349/24, 28, 38, 42–47; 348/307–310, 332
See application file for complete search history.

(56) References Cited

U.S. PATENT DOCUMENTS 8,089,476 B2 * 1/2012 Ishiguro et al. ............... 345/175
2009/0316018 A1 12/2009 Umeda

FOREIGN PATENT DOCUMENTS

| JP | 5-276442 | 10/1993 |
| JP | 2007-180811 | 7/2007 |
| WO | WO-2007/145346 | 12/2007 |
| WO | WO-2007/145347 | 12/2007 |

OTHER PUBLICATIONS

Decker, S. et al. "A 256+256 CMOS Imaging Array with Wide Dynamic Range Pixels and Column-Parallel Digital Output." *Digest of Technical Papers*. IEEE International Solid-State Circuits Coference (ISSCC98). Feb. 6, 1998. pp. 176-177.
Muramatsu, Y. et al. "A Signal-Processing CMOS Image Sensor Using a Simple Analog Program." 2001 IEEE International Solid-State Circuits Conference (ISSCC2001). Feb. 5, 2011. 3 pages.
International Search Report mailed Jun. 22, 2010, directed to International Patent Application No. PCT/JP2010/058303; 2 pages.

* cited by examiner

Primary Examiner — Kevin Pyo
Assistant Examiner — Don Williams
(74) Attorney, Agent, or Firm — Keating & Bennett, LLP

(57) ABSTRACT

Provided is a photodetecting device having a wider dynamic range with a simple configuration. A photodetecting device includes a photodiode (D1) (photodetecting element); a line RST (reset signal line); a line RS (readout signal line); a sensor row driver (5) (signal control section) that outputs, as a reset signal, a pulse signal generating a second voltage (VSS) to the line RST, and outputs a readout signal to the line RS; an accumulation node (11) connected to the line RST via the photodiode (D1), the accumulation node having a potential that varies with an amount of light received by the photodiode (D1) during a sensing period; and a transistor (M1) (sensor switching element) that reads out a signal corresponding to the variation of the potential of the accumulation node (11), and outputs the signal to the output line. The sensor row driver (5) applies a voltage at a level between a first voltage (V_SSR) and the second voltage (VSS) to the line RST, during at least a part of the sensing period.

12 Claims, 11 Drawing Sheets (a)

(b)

PHOTODETECTING DEVICE AND DISPLAY APPARATUS

REFERENCE TO RELATED APPLICATIONS

This application is a national stage application under 35 USC 371 of International Application No. PCT/JP2010/058303, filed May 17, 2010, which claims the priority of Japanese Application No. JP2009-135308, filed Jun. 4, 2009, the contents of which prior applications are incorporated herein by reference.

TECHNICAL FIELD

The present invention relates to a photodetecting device that includes a photodetecting element such as a photodiode and a phototransistor.

BACKGROUND ART

Conventionally, a photodetecting device that includes a photodetecting element such as a photodiode has been proposed. Such a photodetecting device includes, for example, a photodetecting element, a capacitor that accumulates charges depending on an amount of light received by the photo detecting element, a control line, and a transistor. In this photodetecting device, the resetting of charges in the capacitor, and the reading of charges from the capacitor are controlled by a signal passing through the control line (see, for example, WO 2007/145346, and WO 2007/145347).

Besides, it has been attempted to make the photodetecting device applicable to a wide range of illuminance by switching an exposure time (shutter speed) of the photodetecting element. For example, by using a faster shutter speed, the photodetecting device has a wider dynamic range. When a fast shutter speed is used, however, charges sufficient for detecting light are not accumulated in a portion where only a small amount of light is received (in a dark portion), which causes blocked up shadows to occur in an output image. In contrast, when a slower shutter speed is used, blown out highlights occur in a portion where a large amount of light is received (in a bright portion). Thus, only with the adjustment of exposure time, it was difficult to achieve both of a wider dynamic range and an accurate image. To cope with this, it has been proposed to use a driving method for achieving a wider dynamic range in a CMOS image sensor as a kind of a photodetecting device (see, for example, S. Decker et at, "A 256×256 CMOS Imaging Array with Wide Dynamic Range Pixels and Column-Parallel Digital Output", 1998 IEEE International Solid-State Circuits Conference (ISSCC98) p 176, p 177; and Yoshinori Muramatsu "A Signal-Processing CMOS Image Sensor using a Simple Analog Operation" 2001 IEEE International Solid-State Circuits Conference (ISSCC 2001) p 98).

DISCLOSURE OF INVENTION

However, with the above-described conventional driving method, a larger number of elements and control lines are needed to compose a pixel sensor circuit. For example, in the case of the above-described CMOS image sensor, it is necessary to provide circuit elements of four transistors, one capacitor, and one diode, as well as three control lines (except for VDD, GND, and Column line). Such increases in elements and control lines in number result in a decrease in an aperture ratio.

It is, therefore, an object of the present invention to provide a photodetecting device with a simpler configuration that can achieve a wider dynamic range, and a display apparatus using the foregoing photodetecting device.

A photodetecting device according to one aspect of the present invention includes: a photodetecting element that receives incident light; a reset signal line; a readout signal line; a signal control section that outputs a pulse signal as a reset signal to the reset signal line, and outputs a readout signal to the readout signal line, the pulse signal generating a second voltage having a potential difference $\Delta V\_RST$ with respect to a first voltage; an accumulation node connected to the reset signal line via the photodetecting element, the accumulation node having a potential that varies with an amount of light received by the photodetecting element during a sensing period from when the reset signal is supplied to when the readout signal is supplied; and a sensor switching element that reads out a signal corresponding to the variation of the potential of the accumulation node, and outputs the signal to the output line, in accordance with the readout signal, wherein the signal control section applies a voltage at a level between the first voltage and the second voltage to the reset signal line, during at least a part of the sensing period.

With the present invention, it is possible to provide a photodetecting device having a wider dynamic range with a simple configuration, and to provide a display apparatus using the photodetecting device.

DESCRIPTION OF THE INVENTION

Figure 1:
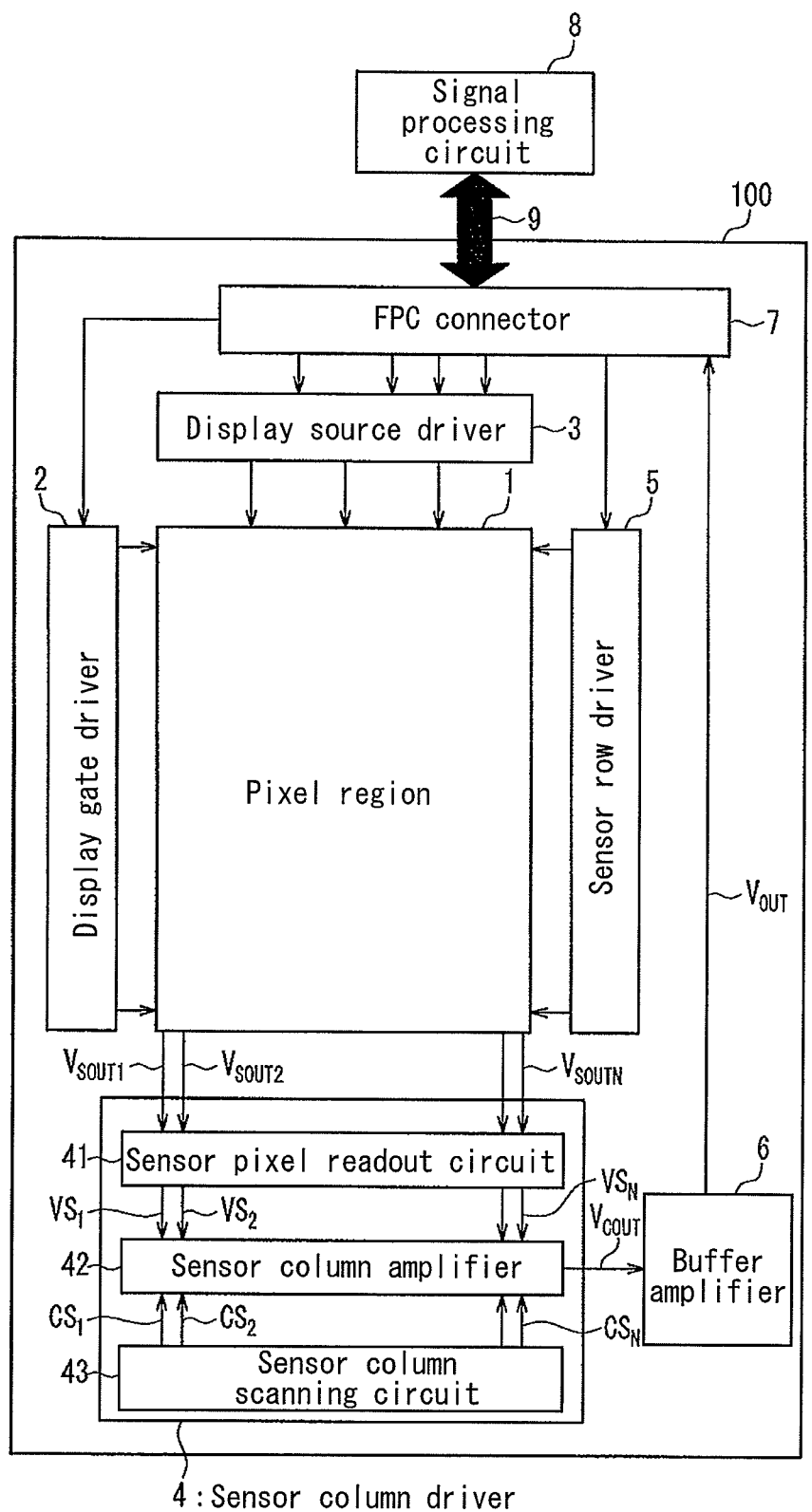
FIG. 1 is a block diagram illustrating a schematic configuration of a display apparatus according to an embodiment of the present invention.

A photodetecting device according to one embodiment of the present invention includes: a photodetecting element that receives incident light; a reset signal line; a readout signal line; a signal control section that outputs a pulse signal as a reset signal to the reset signal line, and outputs a readout signal to the readout signal line, the pulse signal generating a second voltage having a potential difference ΔV_RST with respect to a first voltage; an accumulation node connected to the reset signal line via the photodetecting element, the accumulation node having a potential that varies with an amount of light received by the photodetecting element during a sensing period from when the reset signal is supplied to when the readout signal is supplied; and a sensor switching element that reads out a signal corresponding to the variation of the potential of the accumulation node, and outputs the signal to the output line, in accordance with the readout signal, wherein the signal control section applies a voltage at a level between the first voltage and the second voltage to the reset signal line, during at least a part of the sensing period (first configuration).

With the above-described configuration, during at least a part of the sensing period in which the potential of the accumulation node varies depending on an amount of light received by the photodetecting element, a voltage at a level between the first voltage and the second voltage is applied to the reset signal line. This causes a voltage to be applied to the accumulation node from the reset signal line via the photodetecting element (hereinafter this voltage is referred to as V_M). In the case where the potential of the accumulation node has reached to the voltage V_M or has varied to over the voltage V_M during a period from the supply of the reset signal to the application of this voltage, the potential of the accumulation node is reset to a level around the voltage V_M. On the other hand, in the case where the potential of the accumulation node did not reach the voltage V_M during a period from the supply of the reset signal to the application of the voltage V_M, the potential at the time is maintained. In other words, when a large amount of light is received by the photodetecting element, variation in the potential of the accumulation node depending on received light can be suppressed. As a result, such a problem as follows, for example, is unlikely to occur: too much received light causes the potential of the accumulation node to reach a saturation voltage during the sensing period, thereby disabling the determination of the amount of received light. Consequently, the dynamic range of the photodetecting device can be widened. In this way, the potential of the accumulation node is reset via the photodetecting element from the reset signal line, and the voltage applied to the reset signal line is controlled during the sensing period, whereby the dynamic range can be widened. Thus, a wider dynamic range can be obtained, with the number of elements and control lines of an optical sensor being reduced.

In the first configuration, the signal control section may apply, to the reset signal line, a voltage having a potential difference smaller than the potential difference ΔV_RST with respect to the first voltage, at least once during the sensing period (second configuration).

With the application of a voltage to the reset signal line during the sensing period, the dynamic range of the photodetecting device can be widened. Therefore, a wider dynamic range can be achieved, with simple control.

In the first configuration described above, the signal control section may apply, to the reset signal line, a voltage that varies stepwise between the first voltage and the second voltage, during the sensing period (third configuration).

With this configuration, a wider dynamic range can be achieved, with simple control of a voltage applied to the reset signal line.

In any one of the first to third configurations described above, the photodetecting device may further include a reset signal control section that controls a value of the voltage to be applied to the reset signal and a timing of outputting the same based on the signal outputted to the output line by the switching element (fourth configuration).

With this configuration, the relationship between the amount of light received by the photodetecting element during the sensing period, and the variation of the potential of the accumulation node can be controlled. In other words, output characteristics (sensitivity characteristics) of the photodetecting device can be controlled. Further, the output characteristics of the photodetecting device can be controlled appropriately depending on the amount of light received by the photodetecting element.

The fourth configuration described above may be modified so that the reset signal control section controls the value of the voltage to be applied to the reset signal line and the timing of outputting the same based on information relating to an amount of light received by the photodetecting element, the information being obtained from the signal outputted to the output line by the switching element (fifth configuration).

With this configuration, output characteristics of the photodetecting device can be controlled based on the amount of light received by the photodetecting element during the sensing period, which enables appropriate control depending on the amount of light received by the photodetecting device (brightness).

In any one of the first through third configurations described above, the photodetecting device may further include a reset signal control section that performs a switching operation between the application and non-application of the voltage at a level between the first voltage and the second voltage to the reset signal line (sixth configuration). This configuration enables the switching of the dynamic range of the photodetecting device.

Any one of the first through sixth configurations described above may be modified so that the photodetecting device further includes a capacitor, wherein one of terminals of the capacitor is connected to the accumulation node, and the other terminal of the capacitor is connected to the readout signal line (seventh configuration). Further, the photodetecting device may further include either a variable capacitor, or a p-channel thin film transistor, connected to the accumulation node (eighth and ninth configurations).

Embodiments of the present invention also include a display apparatus including the above-described photodetecting device that includes an active matrix substrate having a pixel region, wherein the photodetecting device is provided in the pixel region (tenth configuration). Such a display apparatus may further include: a counter substrate opposed to the active matrix substrate; and a liquid crystal layer interposed between the active matrix substrate and the counter substrate (eleventh configuration).

Hereinafter, more specific embodiments of the present invention are explained with reference to drawings.

The drawings referred to in the following description illustrate only principal members necessary for explanation of the present invention in simplified forms for convenience sake, among the constituent members of embodiments of the present invention. Therefore, the display apparatus according to the present invention can include arbitrary constituent members not shown in the drawings referred to by the present specification. Further, dimensions of the members shown in the drawings do not truly represent dimensions of actual constituent members, a dimensional ratio of each member, and the like.

First Embodiment

Configuration of Display Apparatus Including Optical Sensor

Figure 2:
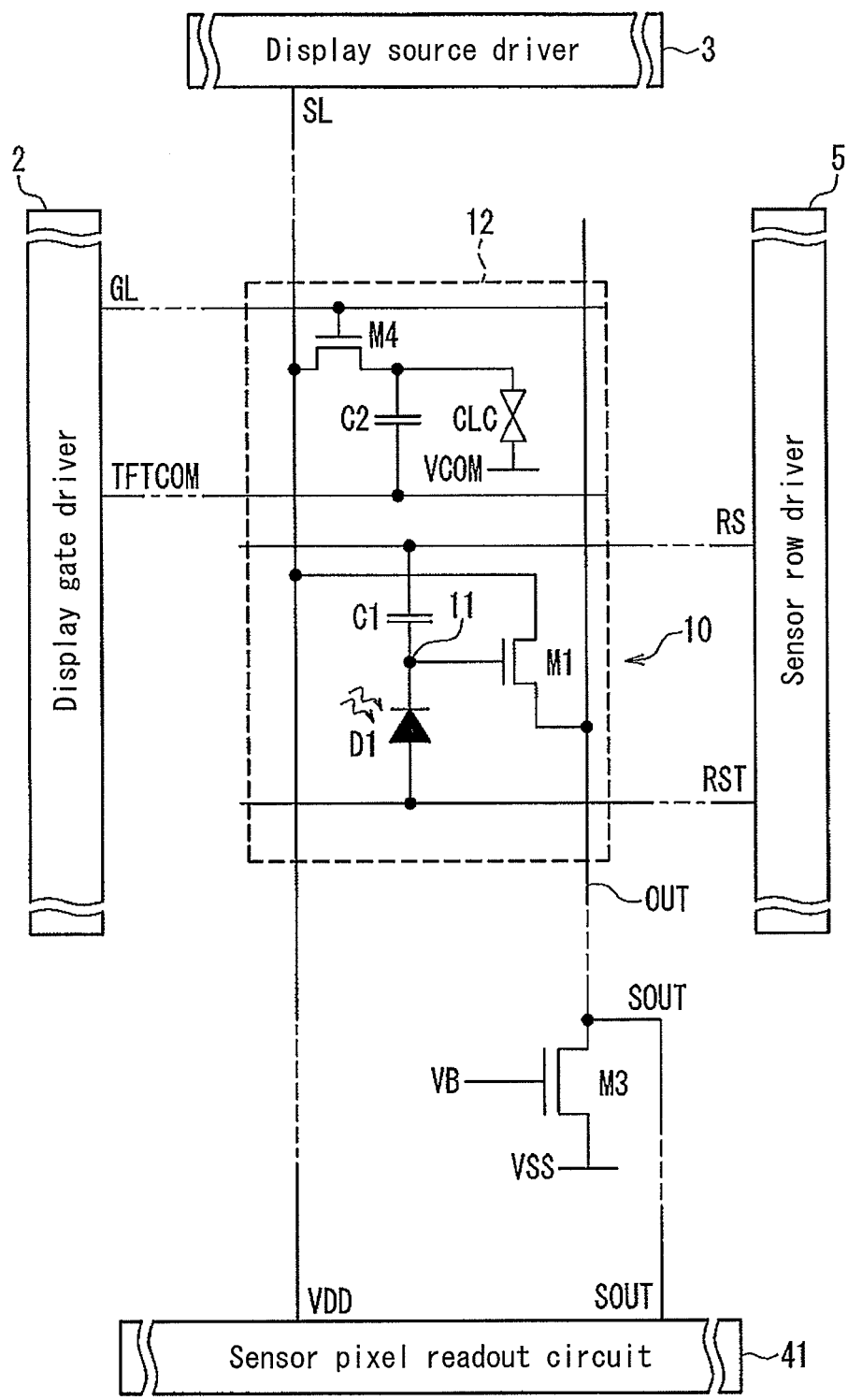
FIG. 2 is an equivalent circuit diagram illustrating a configuration of one pixel in a display apparatus according to a first embodiment.

First, a configuration of an active matrix substrate provided in a liquid crystal display device according to First Embodiment of the present invention is described, with reference to FIGS. 1 and 2.

FIG. 1 is a block diagram showing a schematic configuration of an active matrix substrate 100 provided in a liquid crystal display device (display apparatus) according to one embodiment of the present invention. As shown in FIG. 1, the active matrix substrate 100 includes, on its glass substrate, at least a pixel region 1, a display gate driver 2, a display source driver 3, a sensor column driver 4, a sensor row driver 5 (signal control section), a buffer amplifier 6, and a FPC connector 7. Further, a signal processing circuit 8 for processing an image signal captured by a photodetecting element (to be described later) in the pixel region 1 is connected with the active matrix substrate 100 via the FPC connector 7 and a FPC 9.

It should be noted that the above-described members on the active matrix substrate 100 may be formed monolithically on the glass substrate through semiconductor processing. Alternatively, the configuration may be as follows: the amplifiers and drivers among the above-described members may be mounted on the glass substrate by, for example, COG (chip on glass) techniques. Further alternatively, at least a part of the aforementioned composing members on the active matrix substrate 100 in FIG. 1 could be mounted on the FPC 9. The active matrix substrate 100 is laminated with a counter substrate (not shown) having a counter electrode formed over an entire surface thereof. A liquid crystal material is sealed in interstices between the active matrix substrate 100 and the counter substrate.

The pixel region 1 is a region where a plurality of pixels are formed for displaying images. In the present embodiment, an optical sensor for capturing images is provided in each pixel in the pixel region 1. FIG. 2 is an equivalent circuit diagram showing an arrangement of the pixels and the optical sensors in the pixel region 1 in the active matrix substrate 100. In the example shown in FIG. 2, one pixel circuit 12 includes one pixel and one optical sensor 10. In this case, the pixel region 1 includes the pixels arrayed in a matrix of M rows×N columns, and the optical sensors 10 arrayed likewise in a matrix of M rows×N columns. It should be noted that the ratio of the pixels and optical sensors 10 arrayed is not limited to this example, and may be set arbitrarily. For example, one pixel may be formed with three primary color dots of R (red), G (green), and B (blue), and one optical sensor may be provided in one pixel composed of these three color dots. In this case, the number of the color dots in the pixel region 1 is M×3N. Alternatively, one optical sensor may be provided with respect to a plurality of pixels.

As shown in FIG. 2, the pixel region 1 has gate lines GL and source lines SL arrayed in matrix as lines for pixels. The gate lines GL are connected with the display gate driver 2. The source lines SL are connected with the display source driver 3. It should be noted that M rows of the gate lines GL are provided in the pixel region 1. Hereinafter, when an individual gate line GL needs to be described distinctly, it is denoted by GLi (i=1 to M). On the other hand, three source lines SL are provided per one pixel so as to supply image data to three color dots in the pixel, as described above. When an individual source line SL needs to be described distinctly, it is denoted by SLj (j=1 to N).

At each of intersections of the gate lines GL and the source lines SL, a thin-film transistor (TFT) M4 is provided as a switching element for a pixel. A gate electrode of the thin film transistor M4 is connected to the gate line GL, a source electrode thereof is connected to the source line SL, and a drain electrode is connected to a pixel electrode, which is not shown. Thus, a liquid crystal capacitor CLC is formed between the drain electrode of the thin film transistor M4 and the counter electrode (VCOM), as shown in FIG. 2. Further, an auxiliary capacitor C2 is formed between the drain electrode and a TFT COM.

The optical sensor 10 includes a photodiode D1 as a photodetecting element, a capacitor C1, and a transistor M1. These all are connected to an accumulation node 11. Further, the optical sensor 10 is provided with a line RST through which a reset signal is transmitted (an exemplary reset signal line), and a line RS through which a readout signal is transmitted (an exemplary readout signal line). In the example shown in FIG. 2, the source line SL also functions as a line VDD for supplying a constant voltage VDD from the sensor column driver 4 to the optical sensor. The source line SL also functions as a line OUT (an exemplary output line) for sensor output. The line RST and the line RS are shared by the optical sensors in the same row.

More specifically, the line RST is connected to an anode of the photodiode D1. To a cathode of the photodiode D1, one of electrodes of the capacitor C1 and a gate of the transistor M1 are connected. A drain of the transistor M1 is connected to the line VDD, and a source thereof is connected to the line OUT. In the example shown in FIG. 2, a junction point of the cathode of the photodiode D1, the one of electrodes of the capacitor C1, and a gate of a transistor M2 constitute the accumulation node 11. The other one of the electrodes of the capacitor C1 is connected to the line RS through which a readout signal is transmitted.

In the optical sensor 10, the photodiode D1 is provided between the line RST and the accumulation node 11. Therefore, in the optical sensor 10, the potential of the accumulation node 11 is reset via the photodiode D. More specifically, when the potential of the accumulation node 11 is to be reset, that is, during a reset period, a voltage (reset signal) for forward biasing the photodiode D1 is applied to the line RST. This causes the accumulation node 11 to be initialized to a predetermined potential. Here, a period from when the reset signal is supplied to the line RST to when the readout signal is supplied to the line RS is assumed as a sensing period. In this sensing period, a voltage for applying a reverse bias to the photodiode D1 is applied to the line RST. Thus, during the sensing period, the potential of the accumulation node 11 varies depending on photoelectric current flowing through the photodiode D1. During the sensing period, further, a voltage for controlling the output characteristics of the optical sensor so as to widen the dynamic range is applied to the line RST.

Further, in the optical sensor 10, a capacitor C1 is provided between the line RS and the accumulation node 11. During the sensing period, a voltage is applied from the line RS in such a manner that the potential of the accumulation node 11 can vary depending on the photoelectric current flowing through the photodiode D1. During a readout period, a voltage to boost up the potential of the accumulation node 11 is applied to the line RS so as to raise the potential of the accumulation node 11 to over a threshold electrode of the transistor M1. With this, a signal corresponding to the potential of the accumulation node 11 is output to the line OUT. It should be noted that details about the voltages supplied via these lines RST and RS will be described later.

The lines RST and RS are connected to the sensor row driver 5. These lines RST and RS are provided per each row. Therefore, hereinafter, when the lines should be distinguished, they are denoted by RSTi and RSi (i=1 to M). The sensor row driver 5 is configured so as to output respective signals to the lines RST and RS, which will be described later.

The sensor row driver 5 selects the lines RSTi and RSi in combination shown in FIG. 2 sequentially at predetermined time intervals $t_{row}$. With this, the rows of the optical sensors from which signal charges are to be read out are selected sequentially in the pixel region 1.

Here, the photodetecting device is composed of the optical sensor 10 and the sensor row driver 5.

It should be noted that as shown in FIG. 2, an end of the line OUT is connected to the drain of an insulated gate field effect transistor M3. The drain of this transistor M3 is connected to an output line SOUT (an exemplary output line), so that a potential $V_{SOUT}$ of the drain of the transistor M3 is output as an output signal from the optical sensor to the sensor column driver 4. A source of the transistor M3 is connected to a line VSS. A gate of the transistor M3 is connected to a reference voltage source (not shown) via a reference voltage line VB. Each transistor M1 of each row, together with this bias transistor M3, functions as a source follower amplifier. In the optical sensor 10, a signal voltage output via the output line SOUT from the drain of the transistor M3 is equivalent to a value obtained by amplifying an integral of the photoelectric current of the photodiode D1 during an integration period.

Elements needed in the above-described optical sensor 10 are one transistor, one capacitor, and one photodiode. Control lines needed are only two, i.e., the lines RST and RS, except for VSS, GND, and the source line. Thus, the optical sensor 10 has a smaller number of elements and control lines, and therefore, an area occupied by the optical sensor 10 in the pixel region 1 can be reduced. As a result, the resolution and/or the aperture ratio can be increased.

As shown in FIG. 1, the sensor column driver 4 includes a sensor pixel readout circuit 41, a sensor column amplifier 42, and a sensor column scanning circuit 43. To the sensor pixel readout circuit 41, the lines SOUT (see FIG. 2) for outputting the sensor outputs $V_{SOUT}$ from the pixel region 1 are connected. In FIG. 1, a sensor output that is output via a line SOUTj (j=1 to N) is denoted by "$V_{SOUTj}$".

The sensor pixel readout circuit 41 outputs a peak hold voltage $Vs_j$ of the sensor output $V_{SOUTj}$ to the sensor column amplifier 42. The sensor column amplifier 42 incorporates N column amplifiers corresponding to N rows of optical sensors in the pixel region 1, respectively, so that the peak hold voltage Vs (j=1 to N) is amplified by each column amplifier, thereby outputting it as $V_{COUT}$ to the buffer amplifier 6.

The sensor column scanning circuit 43 outputs a column select signal CSj (j=1 to N) to the sensor column amplifier 42 in order to connect the column amplifiers of the sensor column amplifier 42 sequentially to the output of the buffer amplifier 6.

The buffer amplifier 6 further amplifies $V_{COUT}$ output from the sensor column amplifier 42, and outputs the amplified result as a panel output (optical sensor signal) $V_{OUT}$ to a signal processing circuit 8 side.

With the above-described configuration, the display apparatus according to the present embodiment obtains a panel output $V_{OUT}$ corresponding to an amount of light received by the photodiode D1 formed per pixel in the pixel region 1. The panel output $V_{OUT}$ is sent to the signal processing circuit 8, where it is A/D converted, and is accumulated as panel output data in a memory (not shown). In other words, the same number of sets of panel output data as the number of the pixels (the number of the optical sensors) in the pixel region 1 are accumulated in this memory. The signal processing circuit 8 performs various types of signal processing operations such as image capturing and detection of a touched area, using the panel output data accumulated in the memory.

Exemplary Action of Optical Sensor 10

Figure 3:
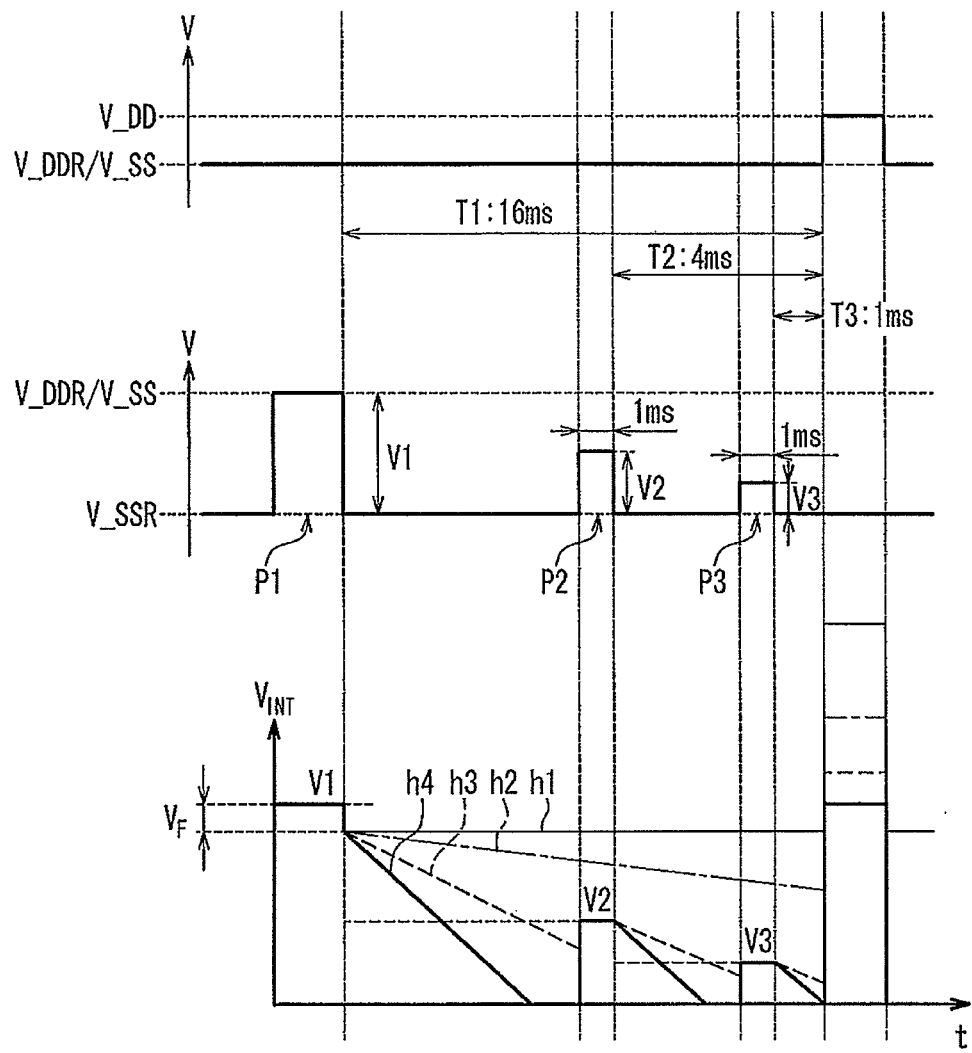
FIG. 3 explains an exemplary action of an optical sensor.

FIG. 3 explains an exemplary action of the optical sensor 10. The upper part of FIG. 3 shows a waveform of a voltage applied to the line RS, the middle part of the same shows a waveform of a voltage applied to the line RST, and the lower part of the same shows variation of a potential $V_{INT}$ of the accumulation node 11. It should be noted that as to the variation of the potential $V_{INT}$ shown in the lower part, four waveforms h1 to h4 are shown as examples thereof. The waveform h1 represents variation of the potential $V_{INT}$ when light incident on the photodiode D1 is small in amount. The waveform h2 represents a waveform when incident light is greater than in the case of the waveform h1, the waveform h3 represents a waveform when incident light is greater than in the case of the waveform h2, and the waveform h4 represents a waveform when incident light is greater than in the case of the waveform h3.

In the example shown in FIG. 3, first, a pulse signal P1 having a height V1 (equivalent to ΔV_RST) is supplied as a reset signal to the line RST from the sensor row driver 5. More specifically, when a voltage applied from the sensor row driver 5 to the line RST rises from a low level (V_SSR) to a high level (V_DDR) (the reset signal is output), the photodiode D1 is forward-biased, and a reset period starts. During the reset period, the potential $V_{INT}$ of the accumulation node 11 is expressed by, for example, the following formula (1).

$$V_{INT} = V\_SSR - V_F \tag{1}$$

In the formula (1), $V_F$ represents a forward voltage of the photodiode D1. Since the $V_{INT}$ here is lower than a threshold voltage of the transistor M1, the transistor M1 is non-conductive during the reset period.

Next, when the signal output from the sensor row driver 5 returns to the low level V_SSR, the reset period ends, and a sensing period starts. Here, a period from when the signal of the line RST returns to the low level V_SSR to when the signal of the line RS rises to the high level (V_DD) (corresponding to the readout signal) is assumed as a sensing period. In the example shown in FIG. 3, the sensing period T1 has a length of 16 ms. The potential $V_{INT}$ of the accumulation node 11 immediately after the reset period ends is expressed by, for example, the following formula (2).

$$V_{INT} = V\_SSR - V_F - V1 \cdot C_{PD}/C_T \tag{2}$$
$$= V_{RST}$$

In the formula (2), V1 represents a pulse height of the reset signal (V_DDR−V_SSR). $C_{PD}$ represents a capacitance of the photodiode D1. $C_T$ represents a capacitance of the optical sensor circuit as a whole, i.e., a total capacitance of the accumulation node 11, which is the sum of a capacitance $C_{INT}$ of the capacitor C1, the capacitance $C_{PD}$ of the photodiode D1, and a capacitance $C_{TFT}$ of the transistor M2 ($C_T = C_{INT} + C_{PD} + C_{TFT}$). Here, $C_T \gg C_{PD}$, $C_{TFT}$ is satisfied.

When the signal of the line RST returns to the low level V_SSR, the photodiode D1 is reverse-biased. Therefore, photoelectric current proportional to an amount of light incident on the photodiode D1 flows into the capacitor C1, thereby causing the capacitor C1 to discharge. Thus, the potential of the accumulation node 11 varies with the amount of light received by the photodiode D1. Here, a period in which the potential of the accumulation node 11 can vary with the amount of light received by the photodiode D1 is assumed to be an integration period. The potential $V_{INT}$ of the accumulation node 11 during the integration period is expressed by the following formula (3).

$$V_{INT}=V_{RST}-I_{PHOTO} \cdot t_{INT}/C_T \qquad (3)$$

In the formula (3), $I_{PHOTO}$ represents photoelectric current of the photodiode D1, and $t_{INT}$ represents a length of the integration period. Since $V_{INT}$ is also lower than the threshold voltage of the transistor M1 during the integration period, the transistor M1 is non-conductive.

When a predetermined period of time (11 ms in the example shown in FIG. 3) passed after the sensing period started, a pulse voltage P2 having a height V2 and a width of 1 ms is applied to the line RST by the sensor row driver 5. Here, the height V2 of the pulse voltage P2 is smaller than V1. In other words, a voltage at a level between the high level and the low level of the reset signal is temporarily applied to the line RST. The application of this pulse voltage P2 causes a voltage of, for example, $V_{P2}$=V_SSR+V2−$V_F$, to be applied to the accumulation node 11. Here, in the case where the potential $V_{INT}$ of the accumulation node 11 does not reach $V_{P2}$ (for example, in the case of the waveform h1 or h2 shown in FIG. 3), the potential $V_{INT}$ of the accumulation node 11 is maintained without any change. On the other hand, the potential $V_{INT}$ of the accumulation node 11 is lower than $V_{P2}$ (for example, in the case of the waveform h3 or h4), the potential $V_{INT}$ of the accumulation node 11 is returned to $V_{P2}$. In other words, the application of the pulse voltage P2 having the height V2 causes an overflow action to be carried out partially. With this, during the period of 11 ms after the supply of the reset signal, the potential $V_{INT}$ of the accumulation node 11 never varies to over $V_{P2}$, even when a large amount of light is incident. As a result, the dynamic range of the optical sensor 10 can be widened as will be described later.

When a predetermined time (2 ms in the example shown in FIG. 3) passed after the pulse voltage P2 was applied, a pulse voltage P3 having a height V3 and a width of 1 ms is further applied to the line RST by the sensor row driver 5. Here, the height V3 of the pulse voltage P3 is smaller than the above-mentioned height V2. The application of this pulse voltage P2 causes a voltage of, for example, $V_{P3}$=V_SSR+V3−$V_F$, to be applied to the accumulation node 11. Here, in the case where the potential $V_{INT}$ of the accumulation node 11 does not reach $V_{P3}$ (for example, in the case of the waveform h1 or h2 shown in FIG. 3), the potential $V_{INT}$ of the accumulation node 11 is maintained without any change. On the other hand, the potential $V_{INT}$ of the accumulation node 11 is lower than $V_{P3}$ (for example, in the case of the waveform h3 or h4), the potential $V_{INT}$ of the accumulation node 11 is returned to $V_{P3}$. In other words, the application of the pulse voltage P3 having the height V3 causes an overflow action to be carried out partially. With this, during the period from 12 ms to 14 ms after the supply of the reset signal, the potential $V_{INT}$ of the accumulation node 11 never varies to over $V_{P3}$, even when a large amount of light is incident.

When 16 ms passed after the sensing period started, a readout signal is output from the sensor row driver 5 to the line RS. In other words, the voltage of the line RS rises from the low level (V_SS) to the high level (V_DD). With this, the sensing period ends, and a readout period starts. Here, change injection to the capacitor C1 occurs. In other words, in response to the readout signal supplied from the sensor row driver 5 to the line RS, the potential of the accumulation node 11 is boosted up through the capacitor C1. Here, the potential $V_{INT}$ of the accumulation node is expressed by, for example, the following formula (4).

$$V_{INT}=V_{RST}-I_{PHOTO} \cdot t_{INT}/C_T+\Delta V_{RS} \cdot C_{INT}/C_T \qquad (4)$$

In the formula (4), $\Delta V_{RS}$ represents a difference between the low level (V_SS) and the high level (V_DD) of the signal supplied to the line RS ($\Delta V_{RS}$=V_DD−V_SS). When such application of the readout signal as described above causes the potential $V_{INT}$ of the accumulation node 11 to become higher than the threshold voltage of the transistor M1, the transistor M1 becomes conductive, and an output signal corresponding to the potential $V_{INT}$ is output to the line OUT.

More specifically, during the sensing period, since the low-level voltage V_SS is applied to the line RS, the transistor M1 becomes non-conductive (OFF), and the integration of photoelectric current is enabled at the accumulation node 11. During the readout period, since the high-level voltage V_DD is applied to the line RS, the potential $V_{INT}$ of the accumulation node 11 is boosted up, and the voltage of the gate of the transistor M1 becomes higher than the threshold voltage.

Here, the potential $V_{INT}$ thus boosted up reflects the amount of light incident on the photodiode during the integration period. For example, in the example shown in FIG. 3, the respective potentials $V_{INT}$ of the waveforms h1 to h4 during the readout period, which are different in the amount of incident light, are different from one another. A potential $V_{INT}$ during the readout period is a synthesis of output values corresponding to different integration periods (T1, T2, and T3) in one pixel. An output signal corresponding to this potential $V_{INT}$ is output via the transistor M1 to the line OUT.

The transistor M1 that outputs an output signal to the line OUT, and the transistor M3, which is a bias transistor provided at an end of the line OUT at each column, function as a source follower amplifier. A signal voltage output from the drain of the transistor M3 via the output line SOUT is equivalent to a value obtained by amplifying an integral of the photoelectric current of the photodiode D1 during the integration period.

When the voltage applied to the line RS returns to the low level (V_SS), the readout period ends. When the readout period ends, the potential of the accumulation node 11 becomes lower than the threshold voltage of the transistor M1 again, and the transistor M1 becomes non-conductive.

The initialization with a reset signal, the integration of photoelectric current during the integration period, and the reading of a sensor output during the readout period as described above, which compose one cycle, are executed cyclically with respect to each row. With the above-described exemplary action of the optical sensor 10, the dynamic range can be widened without any adjustment of a shutter speed.

Effects of Present Embodiment

Figure 4:
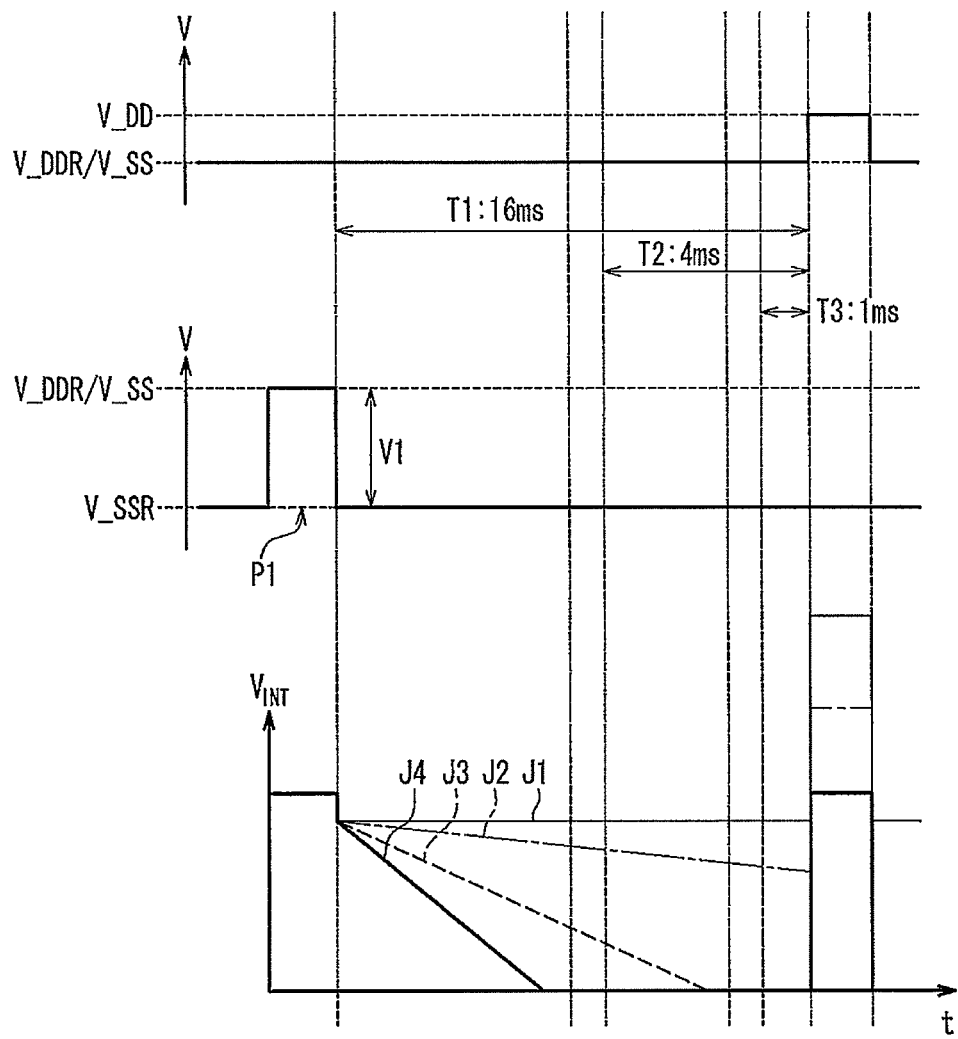
FIG. 4 explains an exemplary action when a reset voltage is set constant during a sensing period.

Effects achieved by the optical sensor 10 according to the present embodiment are described in detail hereinafter. FIG. 4 explains an exemplary action in the case where the voltage of the line RST is set constant at the low level V_SSR during the sensing period. The upper part of FIG. 4 shows a waveform of a voltage applied to the line RS, the middle part of the same shows a waveform of a voltage applied to the line RST, and the lower part of the same shows variation of a potential $V_{INT}$ of the accumulation node 11. It should be noted that four waveforms J1 to J4 in the lower part, showing variation of the potential $V_{INT}$, show waveforms in the cases where light in the same amounts as in the cases of the four waveforms h1 to h4 shown in FIG. 3 are incident, respectively.

In the cases of the waveforms J3 and J4 shown in FIG. 4, since a large amount of light is received by the photodiode D1, the potential $V_{INT}$ of the accumulation node 11 is saturated during the sensing period. Therefore, the potential $V_{INT}$ in the case of the waveform J3 and that in the case of the waveform J4 are identical during the readout period, which do not reflect the amount of light received by the photodiode D1 during the sensing period. In other words, since the dynamic range is narrow, when a large amount of light is received by the photodiode D1, the amount of received light cannot be determined.

In contrast, the pulse voltages P1 and P2 having different heights are applied stepwise to the RST line during the sensing period as shown in FIG. 3, whereby the potential $V_{INT}$ of the accumulation node can be reset stepwise. More specifically, after the reset period until the application of this pulse voltage, in the case where the potential $V_{INT}$ of the accumulation node 11 is lower than the pulse voltage, the potential $V_{INT}$ is returned to the vicinity of the pulse voltage. For example, as in the cases of the waveforms h3 and h4, when a large amount of light is received by a photodetecting element, variation in the potential of the accumulation node 11 depending on received light can be suppressed. As a result, such a problem as follows, for example, is unlikely to occur: too much received light causes the potential of the accumulation node 11 to reach a saturation voltage during the sensing period, thereby disabling the determination of the amount of received light. Consequently, the dynamic range of the optical sensor 10 can be widened.

Figure 5:
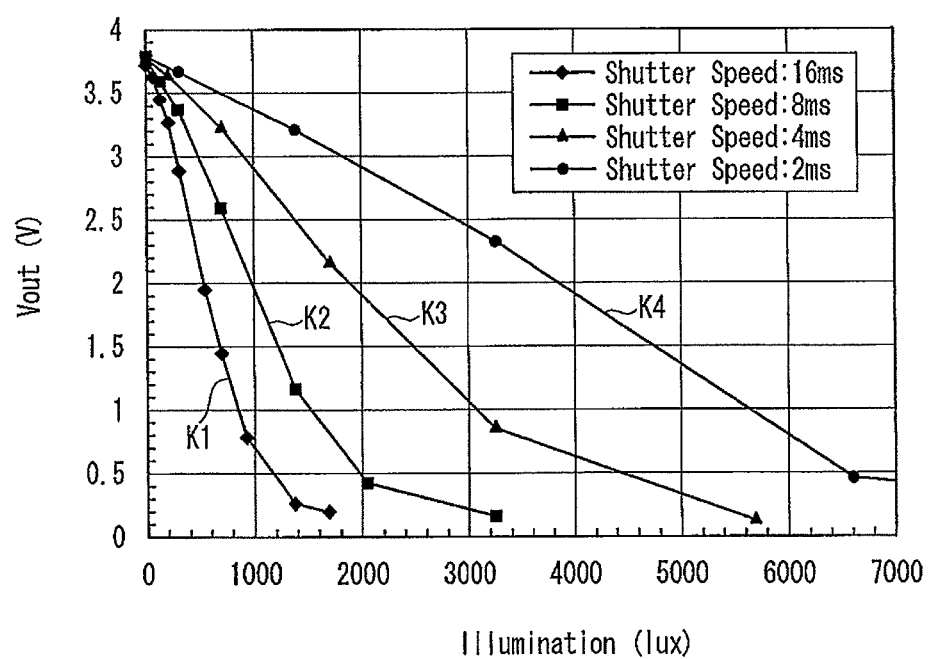
FIG. 5 is a graph showing exemplary sensitivity characteristics when the optical sensor performs the action shown in FIG. 4

FIG. 5 is a graph showing exemplary sensitivity characteristics (output characteristics) in the case where the optical sensor performs the action shown in FIG. 4. The horizontal axis indicates illuminance of light received by the photodetecting element, and the vertical axis indicates a voltage of an output signal from the optical sensor. Lines K1 to K4 plotted by joining points on the graph represent sensitivity characteristics in the cases where the sensing period (shutter speed) T1 are 16 ms, 8 ms, 4 ms, and 2 ms, respectively. As shown in the graph of FIG. 5, if a faster shutter speed is used, the dynamic range of the optical sensor 10 is widened. However, since the sensitivity characteristics are linear, in the case of a small illuminance, the illuminance is unlikely to be reflected in the output voltage. As a result, blocked up shadows tend to occur in dark areas in an output image. When a slower shutter speed is used, since the sensitivity characteristics are linear, an output voltage is also saturated in the case of a large illuminance, and the illuminance is unlikely to be reflected in an output voltage. Consequently, blown out highlights tend to occur in bright areas in an output image.

Figure 6:
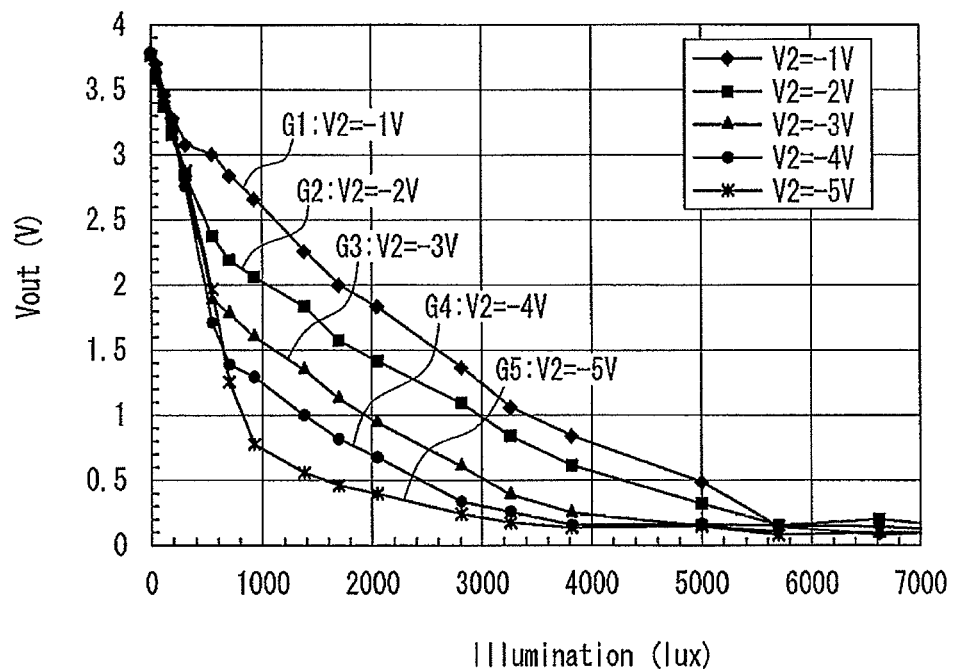
FIG. 6(a) is a graph showing sensitivity characteristics of the optical sensor when the optical sensor acts in the similar manner as the exemplary action shown in FIG. 3.
FIG. 6(b) shows an exemplary waveform of a control signal.
Figure 6:
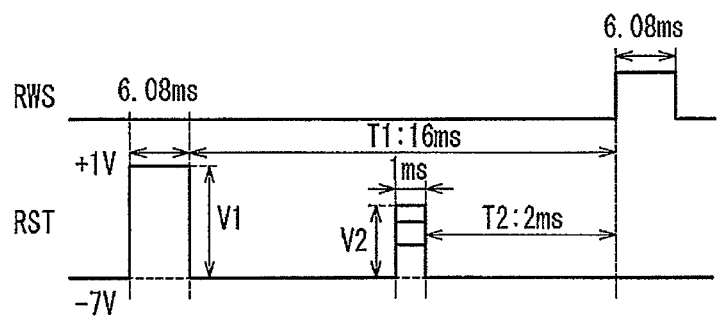

In contrast, FIG. 6(a) is a graph illustrating sensitivity characteristics in the case where the optical sensor 10 according to the present embodiment acts in the same manner as the exemplary action shown in FIG. 3. It should be noted that the graph shown in FIG. 6(a) shows exemplary sensitivity characteristics in the case where a pulse voltage P2 having a height V2 is applied once to the line RST during a sensing period between the output a reset signal having a height V1=V_DDR (+1V)−V_SSR(−7V)=8V, and a pulse width of 6.08 ms and the output of a readout signal having a pulse width of 6.08 ms, as shown in FIG. 6(b). Lines G1 to G5 plotted by joining points on the graph represent sensitivity characteristics in the case where the high levels of the pulse voltage V2 are −1 V, −2 V, −3 V, −4 V, and −5 V (height: 6 V, 5 V, 4 V, 3 V, and 2 V), respectively.

As shown in FIG. 6(a), the sensitivity characteristics of the optical sensor 10 according to the present embodiment exhibit so-called logarithmic characteristics; in an area with a smaller illuminance, the lines have gradients (sensitivity: output voltage/illuminance) with greater absolute values, whereas in an area with a greater illuminance, the lines have gradients with smaller absolute values. For example, as to the sensitivity characteristics indicated by the line G5, a gradient thereof in an area with an illuminance of 0 to 1000 lux and a gradient thereof in an area with an illuminance of 1000 lux or more are different. These two kinds of gradients appearing in the sensitivity characteristics correspond to a sensitivity in the case where an entirety of the sensing period T1 is assumed to be an integration period and a sensitivity in the integration period T2 after the application of the pulse voltage P2, respectively. In other words, the sensitivity characteristics indicated by the lines G1 to G5 are represented by sensitivity characteristic lines corresponding to T1 and sensitivity characteristic lines corresponding to T2. Thus, the application of the voltage V2 during the sensing period allows a gradient of the sensitivity characteristics in the case of a small illuminance and a gradient of the same in the case of a large illuminance to be different. The sensitivity characteristics having logarithmic characteristics are obtained in this way, whereby, for example, a wide dynamic range of the optical sensor 10 can be achieved, with the blocked up shadows in an area with a low illuminance (a dark area) being suppressed. As a result, a wide dynamic range of the optical sensor 10 can be achieved, with blown out highlights and blocked up shadows being suppressed.

It should be noted that the height of an intersection of the sensitivity characteristic line corresponding to T1 and the sensitivity characteristic line corresponding to T2 can be controlled with use of the height V2 of the pulse voltage. For example, an expression of the gradient of T2=the gradient of T1×T2/T1 may be established. Therefore, appropriate sensitivity characteristics can be achieved by appropriately setting the number of pulse voltages applied during the sensing period, the values of the pulse voltages, and the durations of respective integration periods.

In this way, the configuration according to the present embodiment, which is a simple configuration having only one transistor and two control lines as shown in FIG. 2, makes it possible to obtain the optical sensor 10 having a wide dynamic range, while suppressing blown out highlights and blocked up shadows.

Second Embodiment

An example in which a pulse voltage is applied to the line RST during the sensing period has been explained as First Embodiment, but the signal waveform for the line RST is not limited to that in the above-described example. In at least a part of the sensing period, a voltage having a level between the low level V_SSR and the high level V_DDR of the reset signal may be applied, whereby the same effect as that of the above-described embodiment can be achieved.

Described herein as the present embodiment is an example in which the optical sensor 10 acts in such a manner that the voltage for the line RST varies stepwise during the sensing period.

Figure 7:
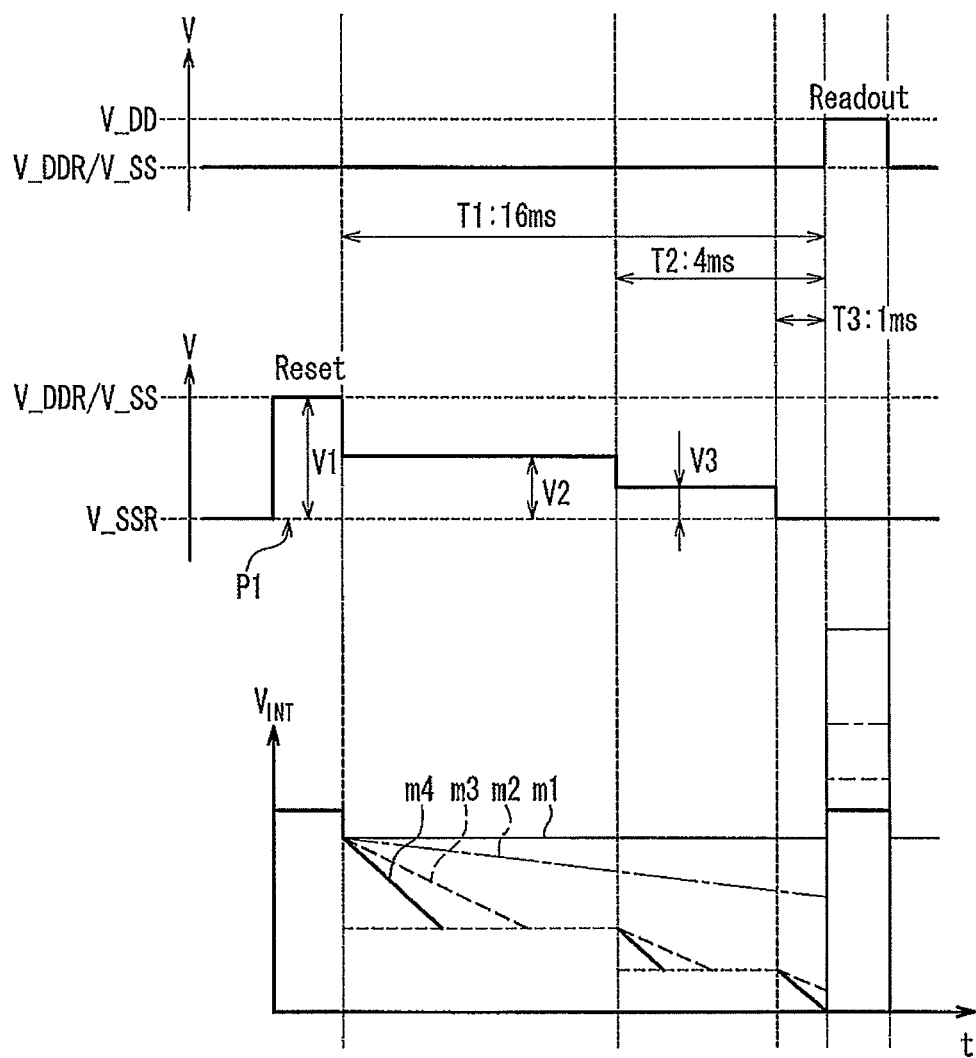
FIG. 7 explains an exemplary action of an optical sensor according to a second embodiment.

FIG. 7 explains an exemplary action of the optical sensor 10 according to Second Embodiment. In FIG. 7, like in FIG. 3, the upper part thereof shows a waveform of a voltage applied to the line RS, the middle part thereof shows a waveform of a voltage applied to the line RST, and the lower part thereof shows variation of the potential $V_{INT}$ of the accumulation node 11. It should be noted that as to the variation of the potential $V_{INT}$ shown in the lower part, four waveforms m1 to m4 are shown as examples thereof. The waveform m1 represents variation of the potential $V_{INT}$ when light incident on the photodiode D1 is small in amount. The waveform m2 represents a waveform when incident light is greater than in the case of the waveform m1, the waveform m3 represents a waveform when incident light is greater than in the case of the waveform m2, and the waveform m4 represents a waveform when incident light is greater than in the case of the waveform m3.

In the exemplary action shown in FIG. 7, first, when a voltage applied from the sensor row driver 5 to the line RST rises from a low level (V_SSR) to a high level (V_DDR), the photodiode D1 is forward-biased, and a reset period starts. After the pulse voltage P1 is applied to the line RST during the reset period, the voltage of the line RST changes to a voltage that is higher the lower level by a height V2 (V_SSR+V2), with which the reset period ends and a sensing period starts. By setting the voltage of the line RST to V_SSR—V2, the photodiode D1 is reverse-biased, whereby photoelectric current proportional to an amount of light incident on the photodiode D1 flows into the capacitor C1, and causes the capacitor C1 to discharge. Thus, the potential of the accumulation node 11 varies with the amount of light received by the photodiode D1.

Thereafter, the voltage V_SSR+V2 of the line RST is maintained for a predetermined period of time from the end of the reset period (until 12 ms elapses in the example shown in FIG. 7). As a result, during the foregoing predetermined period, a voltage of, for example, $V_{P2}$=V_SSR+V2-$V_F$, is applied to the accumulation node 11. In the case where the potential $V_{INT}$ of the accumulation node 11 does not reach $V_{P2}$ during the foregoing predetermined period (for example, in the case of the waveform m1 or the waveform m2 shown in FIG. 3), the potential $V_{INT}$ of the accumulation node 11 is maintained without any change. On the other hand, in the case where the potential $V_{INT}$ of the accumulation node 11 has already reached $V_{P2}$ (for example, in the case of the waveform m3 or the waveform m4), the potential $V_{INT}$ of the accumulation node 11 is maintained at $V_{P2}$. In other words, the application of the voltage V2 causes an overflow action partially. This prevents the potential $V_{INT}$ of the accumulation node 11 from varying to over $V_{P2}$ even if a large amount of light is incident, during the period from the supply of the reset signal to when 12 ms elapses. Consequently, like in First Embodiment, the dynamic range can be widened.

The voltage V_SSR+V2 of the line RST is lowered to a voltage V_SSR+V3 of the line RST after a predetermined period of time elapses. Here, V2>V3 is satisfied. This voltage V_SSR+V3 is maintained for 3 ms in the example shown in FIG. 7, and thereafter it is dropped to the low level V_SSR. As a result, during the period of 3 ms, a voltage of, for example, $V_{P3}$=V_SSR+V3-$V_F$, is applied to the accumulation node 11. In the case where the voltage $V_{INT}$ of the accumulation node 11 is greater than $V_{P3}$ during this period of 3 ms (for example, in the case of the waveform m1 or the waveform m2 shown in FIG. 3), the potential $V_{INT}$ of the accumulation node 11 is maintained without any change. On the other hand, in the case where the potential $V_{INT}$ of the accumulation node 11 reaches $V_{P3}$ during this period of 3 ms (for example, in the case of the waveform m3 or the waveform m4), the potential $V_{INT}$ of the accumulation node 11 is maintained at $V_{P3}$.

In this way, in the example shown in FIG. 7, a voltage that varies stepwise between the high level V_DDR and the low level V_SSR of the reset signal is applied to the line RST during the sensing period. Thus, like in First Embodiment 1, the dynamic range of the optical sensor 10 can be widened.

It should be noted that according to the action shown in FIG. 7, regarding the sensitivity characteristics of the optical sensor 10, straight lines having gradients corresponding to the following periods, respectively, appear: the integration period T1 from when the output of the reset signal stops to when the output of the readout signal starts; the integration period T2 from when the application of the voltage V3 to the line RST starts to when the output of the readout signal starts; and the integration period T3 from when the application of the voltage V3 ends to when the output of the readout signal starts.

With simple control of the voltage of the line RST as in the present embodiment, that is, varying the voltage of the line RST stepwise during the sensing period, a wide dynamic range is achieved for the optical sensor 10.

Third Embodiment

As described above, the sensitivity characteristics of the optical sensor 10 is influenced by magnitudes of the voltages V2 and V3 applied to the line RST during the sensing period, and timings of the application of the same. The present embodiment relates to a display apparatus that enables the appropriate setting of the sensitivity characteristics of the optical sensor 10 by controlling such magnitudes of the voltages V2 and V3 and such timings of the application.

Figure 8:
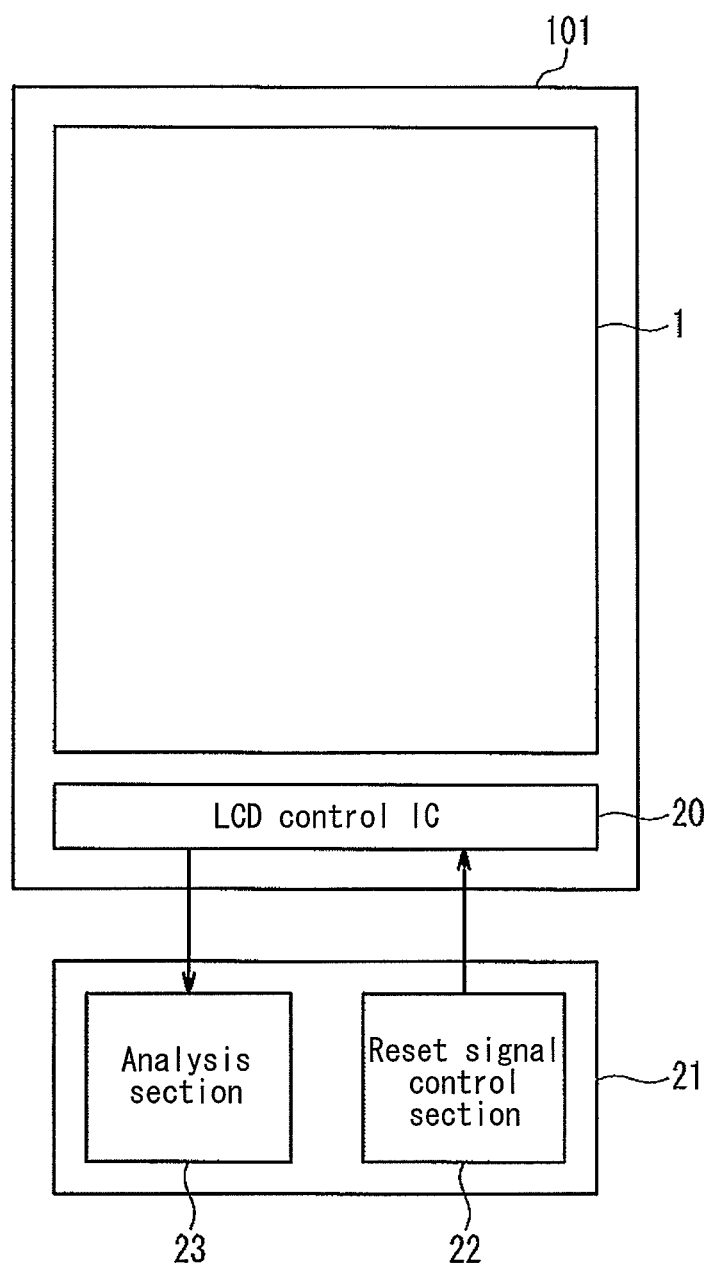
FIG. 8 is a block diagram showing a schematic configuration of a display apparatus according to a third embodiment.

FIG. 8 is a block diagram illustrating a schematic configuration of a display apparatus according to Third Embodiment. The display apparatus 101 shown in FIG. 8 includes a pixel region 1, an LCD control IC 20, and a DSP (Digital Signal Processor: signal processing IC) 21. It should be noted that the pixel region 1 is identical to the pixel region 1 shown in FIG. 1, and the LCD control IC 20 may have functions of the display gate driver 2, the display source driver 3, the sensor column driver 4, the sensor row driver 5, and the buffer amplifier 6 shown in FIG. 1. Besides, the LCD control IC 20 incorporates an A/D converter that converts data of the optical sensor from analog values to digital values, and sends received light data of the optical sensor to the DSP 21.

The DSP 21 includes a reset signal control section 22 for deciding an optimal line RST driving waveform, and an analysis section 23 for receiving an optical sensor signal from the LCD control IC 20 and determining a'brightness. The analysis section 23 receives, as the optical sensor signal, for example, a panel output $V_{OUT}$ shown in the above-described First Embodiment from the LCD control IC 21. The panel output $V_{OUT}$ is sent to the signal processing circuit 8, where it is A/D converted and accumulated as panel output data in a memory (not shown). The analysis section 23 determines a brightness of an image of each pixel, based on the panel output data. The analysis section 23 sends, as determination results, for example, data indicative of a brightness of each pixel, to the reset signal control section 22. The reset signal control section 22 decides an optical line RST waveform corresponding to the brightness of each pixel. The decided line RST waveform is fed back to the LCD control IC 20.

Thus, the analysis section 23 generates information relating to an amount of light received by the photodetecting element, based on the optical sensor signal received from the LCD control IC 20, and transfers the information to the reset signal control section 22. The present embodiment is explained with reference to a case where the information relating to the received light amount is data indicative of a brightness of each pixel, but the information is not limited to this. Examples of such information include information about saturation/non-saturation of a potential of each pixel, and information about a ratio of saturated pixels in the image region.

When, for example, it is dark and there is no saturation region in a pixel group in the pixel region 1, the reset signal control section 22 selects a driving waveform in which the voltage during the sensing period is constant at the low level of V_SSR. On the other hand, when it is bright and the signal is saturated at a certain pixel in the pixel region 1, the reset signal control section 22 may select a driving waveform in which the voltages are applied stepwise during the sensing period as shown in FIG. 3 or FIG. 7. Thus, by switching the driving waveform for the line RST depending on the brightness of the pixel, the dynamic range of the optical sensor 10 can be switched appropriately depending on the brightness.

Further, the reset signal control section 22 may decide an optimal waveform for the line RST based on the brightness of each pixel. For example, in the case where the driving is performed with the signal waveform for the RST line shown in FIG. 3, the reset signal control section 22 sets, as parameters, the respective heights V2 V3 of the pulse voltages P2 and P3, and the lengths of the integration periods T1, T2, and T3, and may decide optimal values of these parameters based on each pixel. For example, the optical sensor is driven with signal waveforms of various patterns of combinations of the heights V2 and V3 of the pulse voltages and values of the integration periods T1, T2, and T3, optical sensor data are obtained, and values of a combination pattern that is considered to have provided the most favorable pixel brightness distribution may be set as the optimal values.

Figure 9:
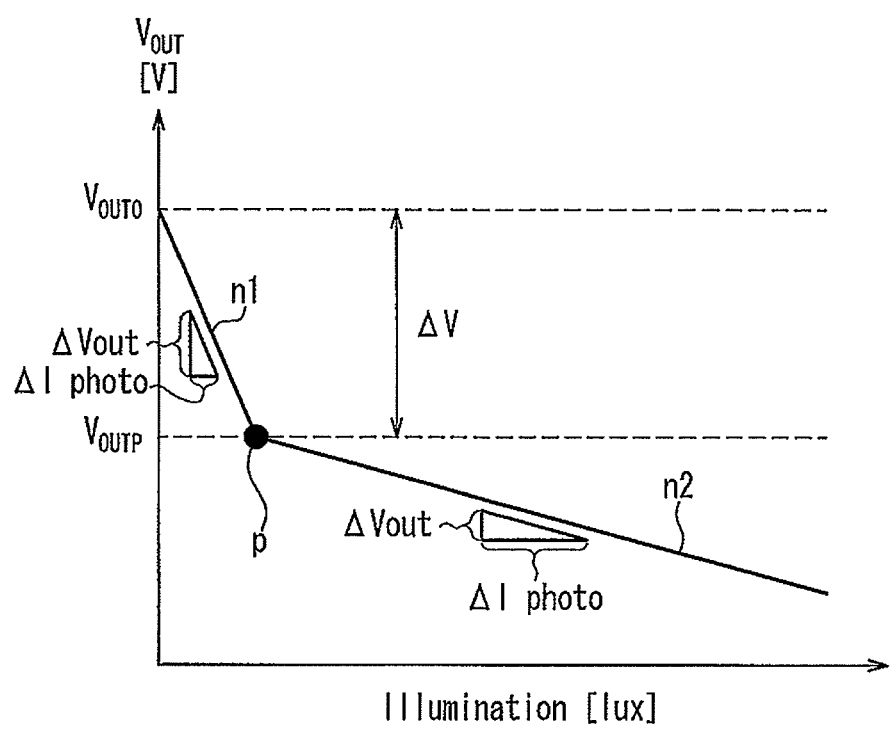
FIG. 9 is a graph schematically showing sensitivity characteristics of the optical sensor.

Here, the relationship between the values of voltages applied during the sensing period and the sensitivity characteristics is explained. FIG. 9 is a graph schematically showing the sensitivity characteristics of the optical sensor 10 when the voltage of the waveform shown in FIG. 6(*b*) is applied to the line RST. In the graph shown in FIG. 9, the horizontal axis indicates illuminance of light, and the vertical axis indicates a voltage of an output signal from the optical sensor. A straight line n1 in a region where the illuminance is small represents sensitivity characteristics during the integration period T1, and a straight line n2 in a region where the illuminance is large represents sensitivity characteristics during the integration period T2. These straight lines n1 and n2 are joined at a point of inflection p. Here, gradients (voltage/illuminance of output signal) of the lines n1 and n2 can be expressed by, for example, the following formulae (5) and (6), respectively.

$$\text{Gradient of line } n1 = \Delta V_{OUT}/\Delta I_{PHOTO} \cdot t1/C_T \quad (5)$$

$$\text{Gradient of line } n2 = \Delta V_{OUT}/\Delta I_{PHOTO} \cdot t2/C_T \quad (6)$$

In the foregoing formulae (5) and (6), $\Delta V_{OUT}$ represents an amount of change in $V_{OUT}$ (voltage output from the transistor M1 to the line OUT in FIG. 2) during a predetermined period of time. $\Delta I_{PHOTO}$ represents an amount of change in photoelectric current during the foregoing predetermined period of time. t1 represents a length of the integration period T1. t2 represents a length of the integration period T2.

Here, since $V_{OUT}$ can be approximated as "$V_{OUT} = V_{INT} - V_{TN}$", $V_{OUT0}$ when the illuminance is 0 can be expressed by the following formula (7).

$$V_{OUT} = V1 - \Delta V_{RS} \cdot C_{INT}/C_T \quad (7)$$

$V_{OUTP}$ at the point of inflection can be expressed by the following formula (8).

$$V_{OUTP} = V2 - \Delta V_{RS} \cdot C_{INT}/C_T \quad (8)$$

According to the formulae (7) and (8) above, a difference $\Delta V$ between $V_{OUT0}$ and $V_{OUTP}$ is V1−V2, and thus, it is determined by a difference between V1 and V2. Therefore, the point of inflection of the sensitivity characteristics can be controlled with the voltage heights added during the sensing period and the integration periods. Utilizing this relationship, the reset signal control section 22 is able to decide the heights of the voltages to be added and the lengths of the integration periods so that the point of inflection of the sensitivity characteristics of the optical sensor 10 is set appropriately. For example, in the case where the value of the output voltage is saturated due to a too large illuminance at more than a predetermined number of pixels in the pixel region 1, the reset signal control section 22 is able to decide V1 and V2 so that the point of inflection P increases by a predetermined value.

It should be noted that the signal waveform optimization processing by the reset signal control section 23 is not limited to the above-described example. For example, optimal values of the aforementioned parameters may be calculated with use of a known optimization algorithm. As described above, according to the present embodiment, it is possible to decide an appropriate reset waveform depending on a brightness of a pixel, and feed it back to the LCD control IC 20 of the panel. In other words, by constructing such a feedback system as described above, an optimal dynamic range corresponding to an image can be realized.

Fourth Embodiment

In First to Third Embodiments, the capacitor C1 is provided in the optical sensor 10 so as to form the accumulation node 11 for holding a potential corresponding to photoelectric current of the photodiode D1. The configuration of the optical sensor, however, is not limited to this, and for example, a variable capacitor, a p-type thin-film transistor, or the like may be used in place of the capacitor C1.

Figure 10:
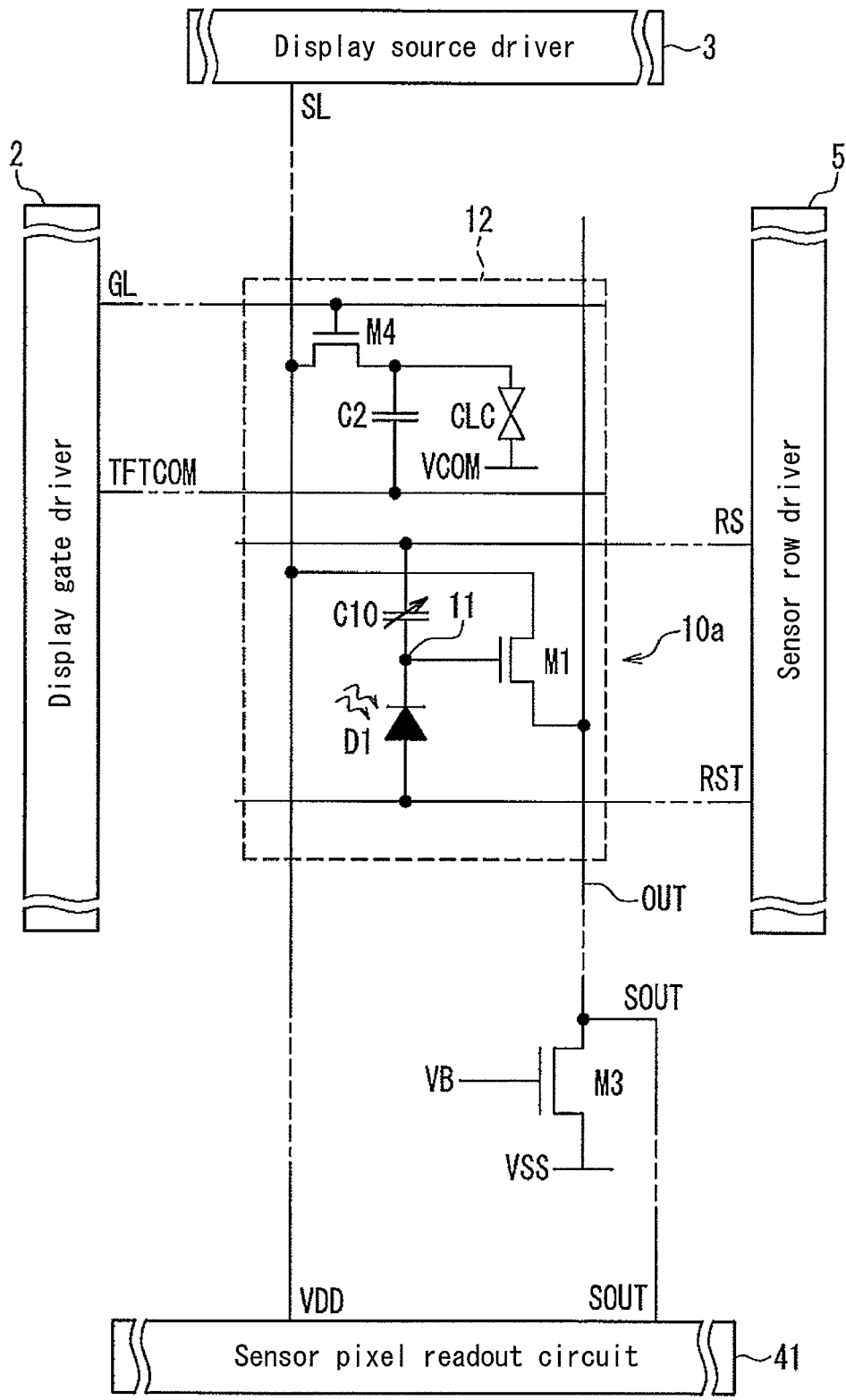
FIG. 10 shows an example of the optical sensor in the case where a variable capacitor is used therein.

FIG. 10 shows an example in the case where in the optical sensor 10 shown in FIG. 2 a variable capacitor is used in place of the capacitor C1. The optical sensor 10*a* shown in FIG. 10 includes a photodiode D1, a variable capacitor C10, and a transistor M1. In this configuration, the variable capacitor C10 functions as an amplifying element. The variable capacitor C10 can be formed with, for example, a p-channel MOS capacitor.

Figure 11:
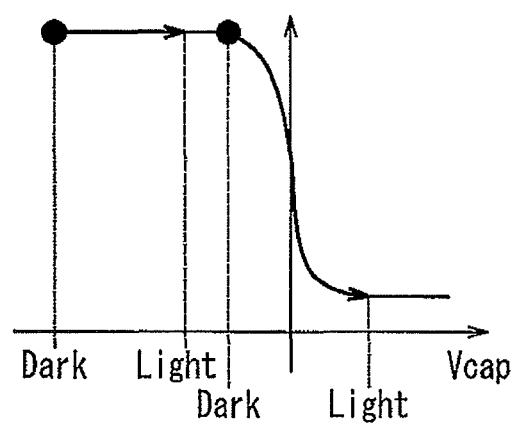
FIG. 11 is a CV characteristic diagram of the variable capacitor.

FIG. 11 is a CV characteristic diagram of the variable capacitor C10. In FIG. 11; the horizontal axis indicates an interelectrode voltage $V_{CAP}$ of the variable capacitor C10, and the vertical axis indicates an electrostatic capacitance. As shown in FIG. 11, the variable capacitor C10 is characterized in that it has a constant electrostatic capacitance when the interelectrode voltage $V_{CAP}$ is small, while the electrostatic capacitance exhibits a precipitous change immediately before and after it reaches a threshold value of the interelectrode voltage $V_{CAP}$. Therefore, the characteristics of the variable capacitor C10 can be varied dynamically with a potential of a readout signal from the line RS. The use of the variable capacitor C10 having such characteristics allows the optical sensor 10*a* to read out an amplified value of a change in the potential of the accumulation node 11 during an integration period.

Figure 12:
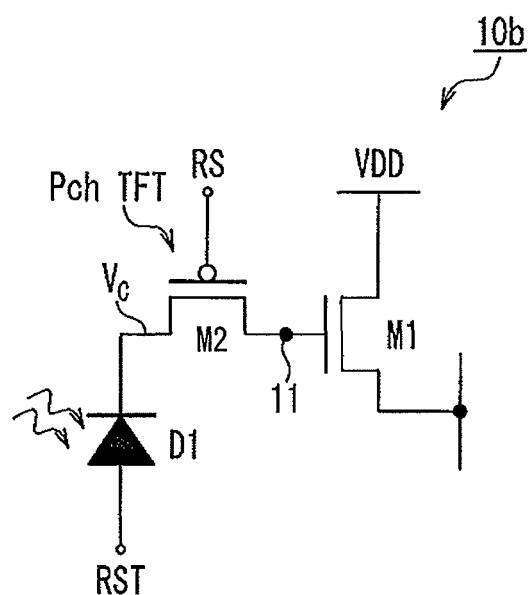
FIG. 12 shows a configuration of the optical sensor in the case where a p-channel TFT is used therein as an amplifying element.

FIG. 12 shows a configuration in the case where a p-channel TFT (transistor M2) is used as an amplifying element in place of the variable capacitor C10 in the optical sensor 10*a* shown in FIG. 10. It should be noted that the action of the optical sensor 10*b* shown in FIG. 12 in which the transistor M2 is used as an amplifying element can be assumed to be similar to the action of the optical sensor 10*a* in FIG. 10.

Therefore, with the optical sensor 10 b also, the potential $V_{INT}$ of the accumulation node 11 can be read out in an amplified state. It should be noted that an n-channel TFT may be used in place of the p-channel TFT.

Other Embodiments

First to Fourth Embodiments described above show exemplary configurations in the cases where the display apparatus according to the present invention is embodied as a liquid crystal display device, but the display apparatus according to the present invention is not limited to a liquid crystal display device, and the present invention is applicable to any display apparatus using an active matrix substrate. It should be noted that the display apparatus according to the present invention is expected to be used as the following apparatus: a touch-panel-equipped display apparatus that performs an input operation by detecting an object in proximity to a screen; and a display apparatus for bidirectional communication having a display function and an image pick-up function.

Further, the optical sensor is applicable to, not only an optical-sensor-equipped display apparatus, but also another apparatus such as an image scanner. Still further, the configuration of the optical sensor is not limited to those of First to Fourth Embodiments described above. Each embodiment is applicable to an optical sensor configured to reset a potential of an accumulation node via a photodetecting element by a reset signal line. The reset signal is not limited to that in the form of rising from a low level to a high level at the start of the reset period; it may be in such a form that the reset period starts when the signal drops from a high level to a low level. In this case, a photodiode is preferably provided so that the potential of the accumulation node 11 increases depending on photoelectric current.

Further, an element used as the photodetecting element may be, for example, a phototransistor, other than the photodiode.

INDUSTRIAL APPLICABILITY

The present invention is advantageously applicable to a display apparatus having an optical sensor in a pixel region of an active matrix substrate.

| Descriptions of Reference Numerals | |
|---|---|
| C1, C2 | capacitor |
| C10 | variable capacitor |
| D1 | photodiode |
| M1 to M4 | transistor |
| RS, RST | line |
| 5 | sensor row driver (signal control section) |
| 10 | optical sensor |
| 11 | accumulation node |

The invention claimed is:

1. A photodetecting device comprising:
a photodetecting element that receives incident light;
a reset signal line;
a readout signal line;
a signal control section configured to output a reset signal to the reset signal line, and to output a readout signal to the readout signal line, the reset signal resetting the photodetecting element by increasing from a first voltage to a second voltage having a potential difference ΔV_RST with respect to the first voltage and returning to the first voltage after a predetermined period of time;
an accumulation node connected to the reset signal line via the photodetecting element, the accumulation node having a potential that varies with an amount of light received by the photodetecting element during a sensing period from when the photodetecting element is reset by the reset signal to when the readout signal is supplied; and
a sensor switching element configured to read out a signal corresponding to the variation of the potential of the accumulation node, and outputs the signal to the output line, in accordance with the readout signal,
wherein the signal control section applies a voltage at a level between the first voltage and the second voltage to the reset signal Line, during at least a portion of the sensing period.

2. The photodetecting device according to claim 1, wherein the signal control section applies, to the reset signal line, a voltage having a potential difference smaller than the potential difference ΔV_RST with respect to the first voltage, at least once during the sensing period.

3. The photodetecting device according to claim 1, wherein the signal control section applies, to the reset signal line, a voltage that varies stepwise between the first voltage and the second voltage, during the sensing period.

4. The photodetecting device according to claim 1, further comprising a reset signal control section that controls a value of the voltage to be applied to the reset signal and a timing of outputting the same based on the signal outputted to the output line by the switching element.

5. The photodetecting device according to claim 4, wherein the reset signal control section controls the value of the voltage to be applied to the reset signal line and the timing of outputting the same based on information relating to an amount of light received by the photodetecting element, the information being obtained from the signal outputted to the output line by the switching element.

6. The photo detecting device according to claim 1, further comprising a reset signal control section configured to perform a switching operation between the application and non-application of the voltage at a level between the first voltage and the second voltage to the reset signal line.

7. The photo detecting device according to claim 1, further comprising a capacitor, wherein one of terminals of the capacitor is connected to the accumulation node, and the other terminal of the capacitor is connected to the readout signal line.

8. The photodetecting device according to claim 1, further comprising a variable capacitor connected to the accumulation node.

9. The photodetecting device according to claim 1, further comprising a p-channel-thin film transistor connected to the accumulation node.

10. A display apparatus including the photodetecting device according to claim 1, the display apparatus comprising an active matrix substrate including a pixel region, wherein the photo detecting element is provided in the pixel region.

11. The display apparatus according to claim 10, further comprising:
a counter substrate opposed to the active matrix substrate; and
a liquid crystal layer interposed between the active matrix substrate and the counter substrate.

12. The photodetecting device according to claim 1, further comprising:
a capacitor including one electrode connected with one terminal of the photodetecting element; wherein the reset signal line is connected with another terminal of the photodetecting element; and the readout signal line is connected with another electrode of the capacitor.

* * * * *

UNITED STATES PATENT AND TRADEMARK OFFICE
CERTIFICATE OF CORRECTION

| | | |
|---|---|---|
| PATENT NO. | : 8,698,066 B2 | Page 1 of 1 |
| APPLICATION NO. | : 13/321132 | |
| DATED | : April 15, 2014 | |
| INVENTOR(S) | : Yasuhiro Sugita | |

It is certified that error appears in the above-identified patent and that said Letters Patent is hereby corrected as shown below:

On the Title Page

Please correct the §371 (c)(1), (2)(4) Date, Item (86) as follows:

-- Nov. 17, 2011 --.

Signed and Sealed this
Twenty-second Day of July, 2014

Michelle K. Lee
*Deputy Director of the United States Patent and Trademark Office*